United States Patent [19]

Sato

[11] Patent Number: 5,000,555

[45] Date of Patent: Mar. 19, 1991

[54] ARRANGEMENT IN OPERATION SWITCHES OF MICROSCOPE

[75] Inventor: Manabu Sato, Yokohama, Japan

[73] Assignee: Nikon Corporation, Tokyo, Japan

[21] Appl. No.: 338,613

[22] Filed: Apr. 17, 1989

[30] Foreign Application Priority Data

Apr. 21, 1988 [JP] Japan .............................. 63-53871[U]

[51] Int. Cl.⁵ ...................... G02B 21/26; G02B 21/06; G02B 21/00

[52] U.S. Cl. .................................... 350/530; 350/507; 200/52 R

[58] Field of Search ................ 350/507, 508, 523–533; 200/52 K, 5 R

[56] References Cited

U.S. PATENT DOCUMENTS

| | | | |
|---|---|---|---|
| 4,240,708 | 12/1980 | Bell | 350/530 |
| 4,299,440 | 11/1981 | Hodgson | 350/529 |
| 4,445,758 | 5/1984 | Emmel | 350/530 |
| 4,770,518 | 9/1988 | Emmel | 350/528 |

FOREIGN PATENT DOCUMENTS 56-22168  5/1981  Japan .

Primary Examiner—Jon W. Henry
Attorney, Agent, or Firm—Shapiro and Shapiro

[57] ABSTRACT

A microscope comprises a housing, a stage shiftably arranged on the housing, a shifting device including an operation handle to be rotated by an operator with respect to a shaft provided on the housing and a transmitting mechanism for shifting the stage in response to rotation of the handle, an electric circuit means and an input means for inputting commands to the electric circuit means. The input means includes at least one operation switch arranged on a surface of the housing at a position where the operator's finger can reach the switch without the operator removing his hand from the handle.

15 Claims, 3 Drawing Sheets

ARRANGEMENT IN OPERATION SWITCHES OF MICROSCOPE

BACKGOUND OF THE INVENTION

1. Field of the Invention

The present invention relates to a microscope.

2. Related Background Art

2t It is known in the art to construct a microscope with; a linear shifting device for shifting a stage vertically through handles arranged on both ends of a shaft extending horizontally, and with an electric circuit responding to signals from switches. Japanese Utility Model Publication No. 56-22168, for example, discloses a linear shifting device wherein appropiate reduction gears are arranged between a plurality of coaxial handles and a pinion shaft and wherein vertical movement of a rack meshed with a pinion fixed to the pinion shaft can be selected among rough movement, fine and rough movements, intermediate movement and fine movement, by changing a transmission ratio between the plural handles and the pinion shaft. Further, as the electric circuit, a control circuit for photographic apparatuses can be used.

In the past, the switches for sending operation commands to such a control circuit were arranged together on a front surface of a base of the microscope or on a control box provided separately from the microscope body.

With such conventional arrangement of the switches of the microscope, although the microscope could be made compact and the operability thereof could be improved by concentrating the operating means in a limited area, a series of smooth operations, such as inspection of a specimen and then photographing the specimen, could not easily achieved.

For example, after the specimen is set, when the specimen is photogrpahed the operator must interrupt his inspection of the specimen in order to bring his finger to a shutter switch.

Further, in a recent microscope including an electrically operated revolver, the following procedures must be carried out: firsr of all, a desired magnification of the microscope is selected by manipulating a changing switch of the revolver; then, an object (specimen) is focused by manipulating a linear rough-fine adjustment device; and then the object is photgraphed by manipulating the shutter switch. With a conventional switch arrangement, this series of manipulations cannot be performed smoothly.

SUMMARY OF THE INVENTION

Accordingly, an object of the present invention is to eliminate the above-mentioned drawback of conventional switch arrangments and thus to provide a microscope which has improved operability.

the present invention provides a microscope having a linear shifting device for shifting a stage vertically through handles arranged on both ends of a shaft extending horizontally and having an electric circuit responding to signals from switches, wherein a first switch is arranged on an outer housing surface extending in parallel with an axial direction of a fine adjustment handle of the linear shifting device and second, third and fourth switches are arranged on an outer surface of the housing extending perpendicular to said axial direction the switches further being arranged in such a manner that when the operator places his index finger in manipulative engagement with the outer periphery of the handle with his palm facing the microscope, the first switch is positioned in a path of natural movement of the thumb, the second, third and fourth switches are positioned in paths of natural movements of the operator's middle finger, third finger and small finger, respectively.

With this arrangement, the operator can manipulate all of the first, second, third and fourth switches simply by the movement of his thumb or appropriate finger without moving his hand away from the fine adjustment handle.

Accordingly, the operability of the microscope can be improved by assigning functions used with the greatest frequency to these four switches.

For example, when the first switch is used as a shutter switch, the second switch is used as a command switch for controlling positive rotation of the revolver, the third switch is used as a command switch for controlling reverse rotation of the revolver, and the fourth switch is used as an illumination switch for controlling the illumination of a reticle, respectively, a series of photo-taking operations can be carried out without shifting the operator's hand, thus improving the operability of the microscope.

DESCRIPTION OF THE PREFERRED EMBODIMENT

Figure 1:
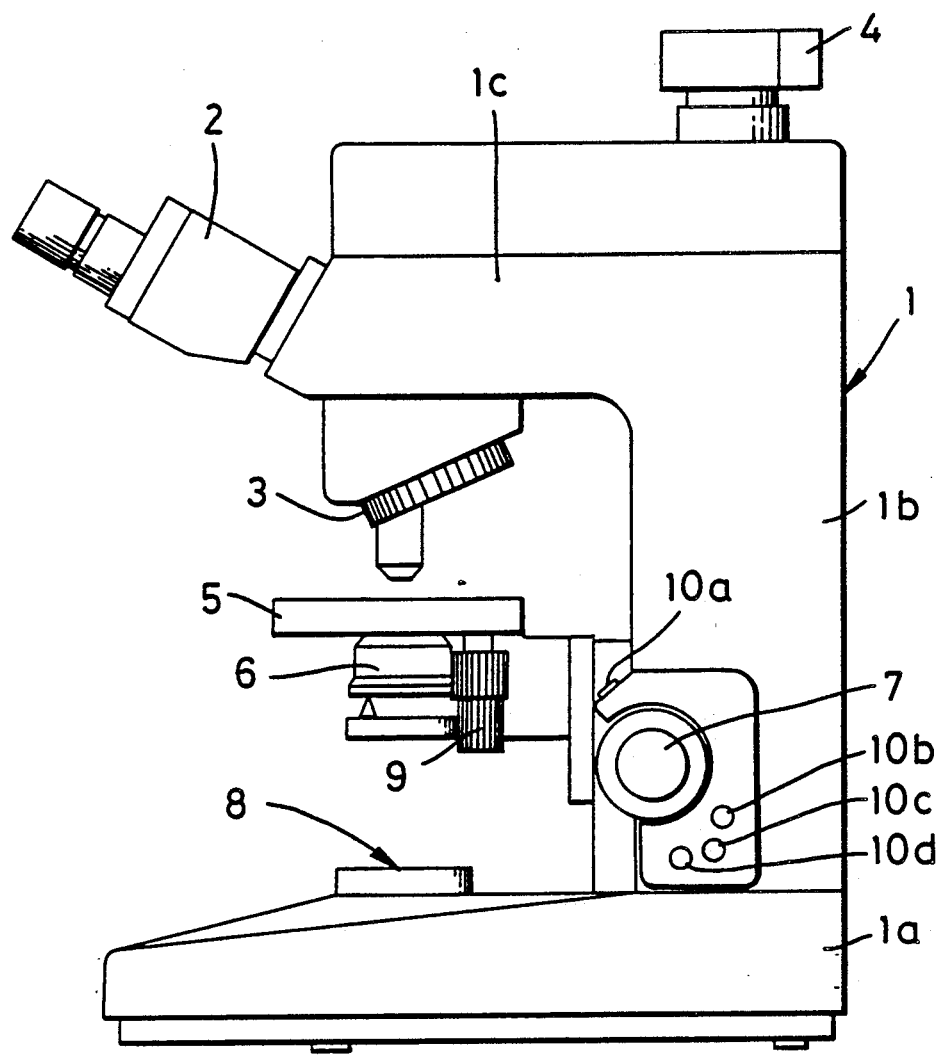
FIG. 1 is a side view of a microscope according to a preferred embodiment of the present invention.
Figure 2:
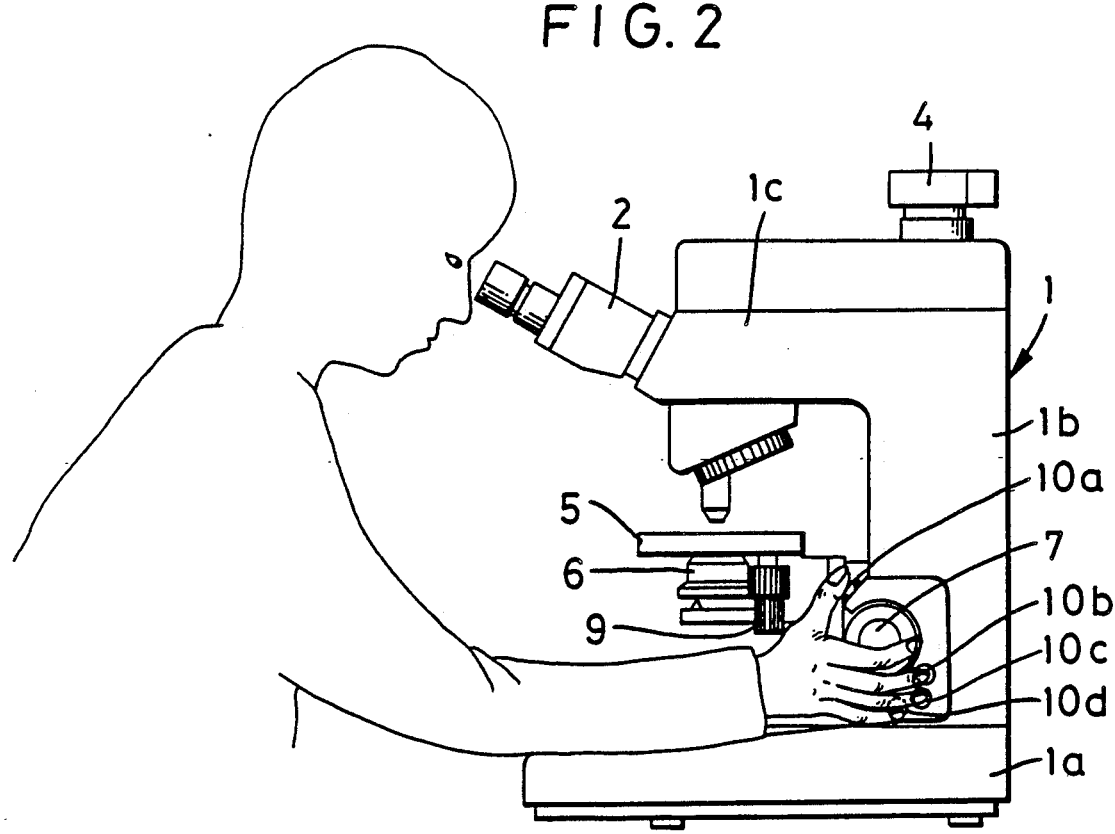
FIG. 2 is a view of the microscope of FIG. 1 showing a condition of usage thereof.
Figure 3:
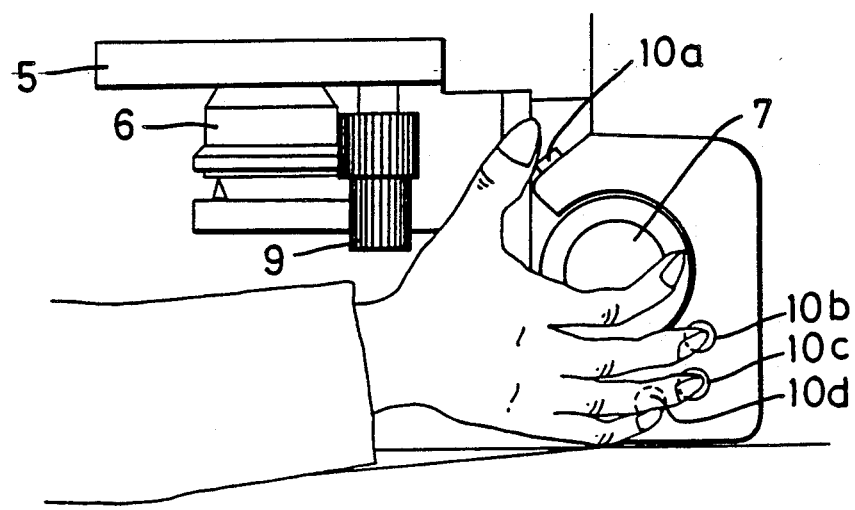
FIG. 3 is an enlarged view of a linear shifting device of the microscope of FIG. 2.

A housing 1 of a microscope, as is well known, comprises a base 1a, strut 1b and arm 1c. An eyepiece portion 2, a revolver 3 and a camera 4 are attached to the arm 1c, and a vertically movable stage 5, a condenser 6, a linear rough-fine adjustment handle for moving the stage 5 are mounted on the strut 1b. A light source incorporated into the base 1a emits illumination light which is introduced into the condenser 6 through a collector 8. Further, a knob 9 is provided for shifting the stage 5 along perpendicular axes in a horizontal plane.

The linear rough-line adjustment handle 7 comprises dual handle portions which are connected, through gears, to pinion shaft extending perpendicular to the plane of FIG. 1(that is, horizontally). An example of such adjustment drive mechanism is disclosed as a rough-fine adjustment device for precision machinery in the Japanese Utility Model Publication No. 56-22168. Preferably, the inner of the dual handle portions of the linear rough-fine adjustment handle 7 constitutes the fine adjustment handle.

Around linear rough-fine adjustment handle 7, four button switches 10a, 10b, 10c and 10d are arranged. The first switch 10a is arranged on an outer surface of the housing 1 extending substantially in parallel with the pinion shaft rear the handle 7, and the seoncd, third and fourth switches 10b, 10c and 10d are arranged on an outer surface of the housing 1 extending, substantially perpendicular to the pinion shaft (that is vertically) rear the handle. The switches are further arranged such that when the operator places his index finger in manipulative engagement with the outer periphery of the fine adjustment handle portion of handle 7, with the palm of the hand facing the microscope, the first switch 10a is positioned in a path of natural movement of the thumb, and the second, third and fourth switches 10b, 10c and 10d are positioned in paths of natural movements of the operator's middle finger, third finger and small finger, respectively.

The first switch 10a is a shutter switch for taking a photograph, the second switch 10b is a command switch for controlling positive rotation of the electrically operated revolver 3, the third switch 10c is a command switch for controlling reverse rotation of the revolver 3, and the fourth switch 10d is a reticle illumination switch for illuminating a reticle situated in a view field of the eyepiece portion 2.

Figure 4A:
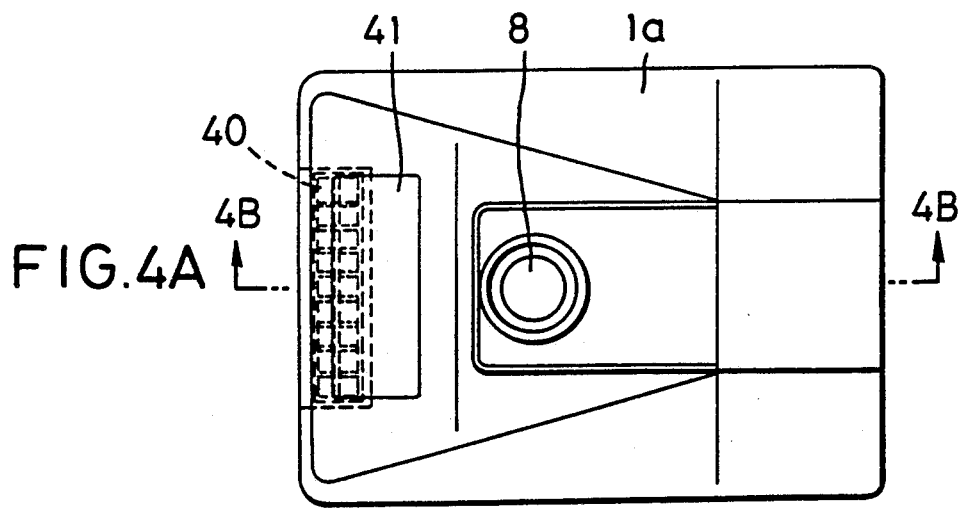
FIGS. 4A and 4B are a plan view and a sectional view, respectively, showing a keyboard incorporated into a base of the microscope.
Figure 4B:
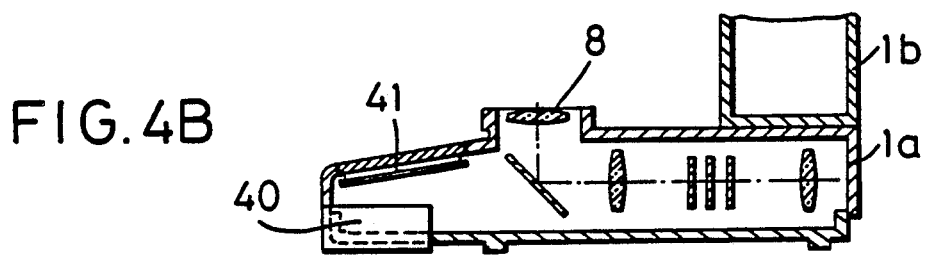
Figure 5A:
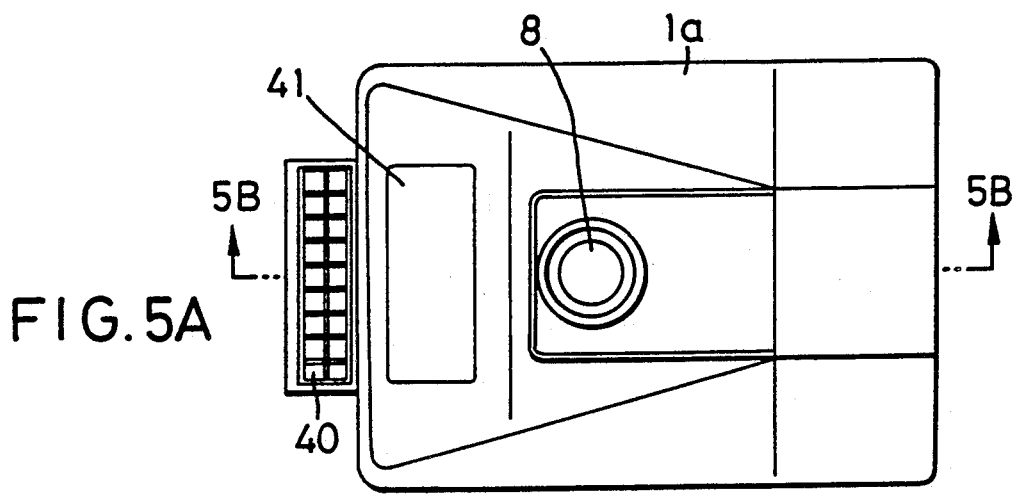
FIGS. 5A and 5B are a plan view and a sectional view, respectively, showing the keyboard of FIGS. 4A and 4B in a condition that is extended or with drawn from the base.
Figure 5B:
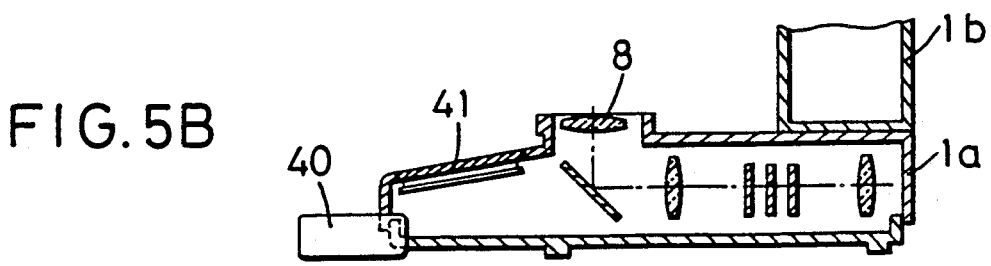

As shown in FIGS. 4A and 4B, a keyboard 40 is normally retracted within the base 1a and includes ten-keys and other switches for manually inputting photgraphic information as a shutter speed, film speed, amount of exposure and the like. The keyboard 40 can be extended or withdrawn (see FIGS. 5A and 5B) along guides to access the keyboard for inputting the above-mentioned information and control commands.

Further, on the base 1a, a liquid crystal panel 41 is also provided for displaying the operating condition of the microscope, the inputted information and the like.

With this arrangement, after the operator withdraws the keyboard 40 out of the base and inputs the necessary information and control commands through the keyboard, he can carry out a series of normal operations such as changing the magnification of the microscope, focusing, illumination of the reticle and photographic exposure, all without removing or separating his hand from the linear rough-fine adjustment handle 7. Thus, the operability of the microscope is significantly improved.

Incidentally, in general, since there is a left-handed or right-handed handle 9 for shifting the stage 5 in X-Y directions, if the first, second, third and fourth switches are provided on both sides of the microscope, either types of handle 9 may be used.

In addition, the functions or roles of the switches may be suitably changed in accordance with importance of the functions, in a place of the abovementioned allotment.

Further, by the use of shift function of a shift switch provided on the keyboard, it is possible to allot a plurality of functions to each of the switches. For example, if the counting functions for counting the number of calls and/or particles of the specimen in the view field are allotted to the switches 10b, 10c and 10d as a count-up, count-down and count reset functions, respectively, the counting operation can be carried out while inspecting the specimen.

Furthermore, by using the retractable keyboard, the following advantages are obtained: first of all, if only single functions of the first, second, third and fourth switches 10a-10d are sufficient, the normal functions can be carried out without using the keyboard. In this case, by retracting or accomodating the keyboard into the base, the operation area can be reduced and simplified.

Also, if additional functions are desired, by drawing the keyboard out of the base, the keyboard can be used for carrying out such additional functions. Therefore, in use, the normal functions and the additional functions can be clearly distinguished from each other.

Secondly, with the retractable keyboard space can be effectively utilized. For example, since a displaying area of the display can be increased by using the retractable keyboard, freedom of design of the display itself is increased, thus allowing for a display which is easier to see.

As will be appreciated from the foregoing description according to the present invention, various display functions and control functions can be incorporated into the housing of the microscope without using an exclusive control box, and the operability of the microscope can be improved by arranging the switches 10a-10d around the handle 7.

I claim:

1. A microscope comprising:
   a housing having a base portion, an arm portion for supporting an eyepiece, and a strut portion extending generally vertically from said base portion and supporting said arm portion,
   means including an operation handle disposed to one side of said strut portion for effecting upward and downward movement of a specimen supporting stage of the microscope, said handle being manually rotatable on a horizontal axis, and
   a plurality of electrical button switches each having a button arranged near a periphery of said handle, and including a first electrical button switch having its said button disposed at a surface of said housing extending substantially parallel to said rotation axis of said handle, and at least one additional electrical button switch having its said button disposed at a substantially vertical surface of said housing to said one side of said strut portion, said buttons of said switches being positioned such that while an operator manipulatively engages said handle to effect rotation thereof by hand, with the palm of the hand facing the microscope, said button of said first switch may be naturally engaged by the thumb of the hand and said button of said additonal switch may be naturally engaged by a finger of the hand.

2. A microscope according to claim 1, wherein said switches have their said buttons positioned for engagement by the thumb and finger as aforesaid when the operator effects manipulative engagement of said handle with the index finger of said hand in contact with the handle periphery.

3. A microscope according to claim 1, wherein said switches have their said buttons arranged to opposite sides of said handle.

4. A microscope according to claim 1, including a plurality of said additional switches, each with its said button positioned to be naturally engaged as aforesaid by a different finger of said hand.

5. A micrscope according to claim 4, wherein said additional switches have their said buttons arranged generally oppositely across said handle from said button of said first switch.

6. A microscope according to claim 4, wherein said additional switches have their said buttons disposed in an arcuate arrangement along the periphery of said handle.

7. A microscope according to claim 6, wherein said additional switches have their said buttons arranged generally oppositely across said handle from said button of said first switch, with said button of said first switch being disposed upwardly from said rotation axis of said handle and said buttons of said additional switches being disposed downwardly from said rotation axis.

8. A microscope according to claim 4 wherein one of said additional switches controls rotation of an electrically operated revolver of the microscope in a first direction and another of said additonal switches controls rotation of said revolver in an opposite direction.

9. A microscope according to claim 4, wherein said first switch controls an operation of a camera of the microscope.

10. A microscope comprising:
a housing having a base portion, and arm portion for supporting an eyepiece, and a strut portion extending generally vertically from said base portion and supporting said arm portion,
means including an operation handle disposed to one side of said strut portion for effecting upward and downward movement of a specimen supporting stage of the microscope, said handle being manually rotatable on a horizontal axis, and
an electrical button switch having a button arranged near a periphery of said handle upwardly from said rotation axis of said handle at a surface of said housing extending substantially parallel to said rotation axis, such that while an operator manipulatively engages said handle to effect rotation thereof by hand, with the palm of the hand facing the microscope, said button of said switch may be naturally engaged by the thumb of the hand.

11. A microscope according to claim 10, wherein said switch has said button positioned for engagement by the thumb as aforesaid when the operator effects manipulatyive engagement of said handle with the index finger of said hand in contact with the handle periphery.

12. A microscope comprising:
a housing having a base portion, an arm portion for supporting an eyepiece, and a strut portion extending generally vertically from said base portion and supporting said arm position,
means including an operation handle disposed to one side of said strut portion for effecting upward and downward movement of a specimen supporting stage of the microscope, said handle being manually rotatable on a horizontal axis, and
a plurality of electrical button switches each having a button arranged near a periphery of said handle at a substantially vertical surface of said housing to said one side of said strut portion, such that while an operator manipulatively engages said handle to effect rotation therefor by hand, with the palm of the hand facing the microscope, said buttons of said switches may be naturally engaged by respective fingers of the hand.

13. A microscope according to claim 12, wherein said switches have their said buttons positioned for engagement by fingers as aforesaid when the operator effects manipulative engagement of said handle with the index finger of said hand in contact with the handle periphery.

14. A microscope according to claim 12, wherein said switches have their said buttons disposed in an arcuate arrangement along the periphery of said handle.

15. a microscope according to claim 12, wherein said switches have their said buttons disposed downwardly from said rotation axis of said handle.

* * * * *